United States Patent

Tsukakoshi

[11] Patent Number: 5,578,807
[45] Date of Patent: Nov. 26, 1996

[54] ELECTROMAGNETIC COUNTER

[76] Inventor: Shigeru Tsukakoshi, 2-3-701, Tsutsujigaoka 3-chome, Akishima-shi, Tokyo 196, Japan

[21] Appl. No.: 287,368

[22] Filed: Aug. 8, 1994

[51] Int. Cl.⁶ .................................................. G01C 22/00
[52] U.S. Cl. ................. 235/95 R; 235/91 M; 235/1 C; 235/96
[58] Field of Search ........................... 235/95 R, 96, 235/91 M, 1 C

[56] References Cited

U.S. PATENT DOCUMENTS 3,580,498  5/1971  La Pointe ........................... 235/91 M
3,602,426  9/1971  Affel ..................................... 235/1 C Primary Examiner—Cassandra C. Spyrou
Attorney, Agent, or Firm—Kanesaka & Takeuchi

[57] ABSTRACT

A welded portion is formed by mounting a synthetic resin frame, in which a count display device including character wheels, a driving device for operating the count display device, and a driving source of the driving device, are incorporated, within a casing from the open side of the casing, and welding at least one portion of the contact portion of the frame and said synthetic resin casing using an ultrasonic welding device.

6 Claims, 5 Drawing Sheets

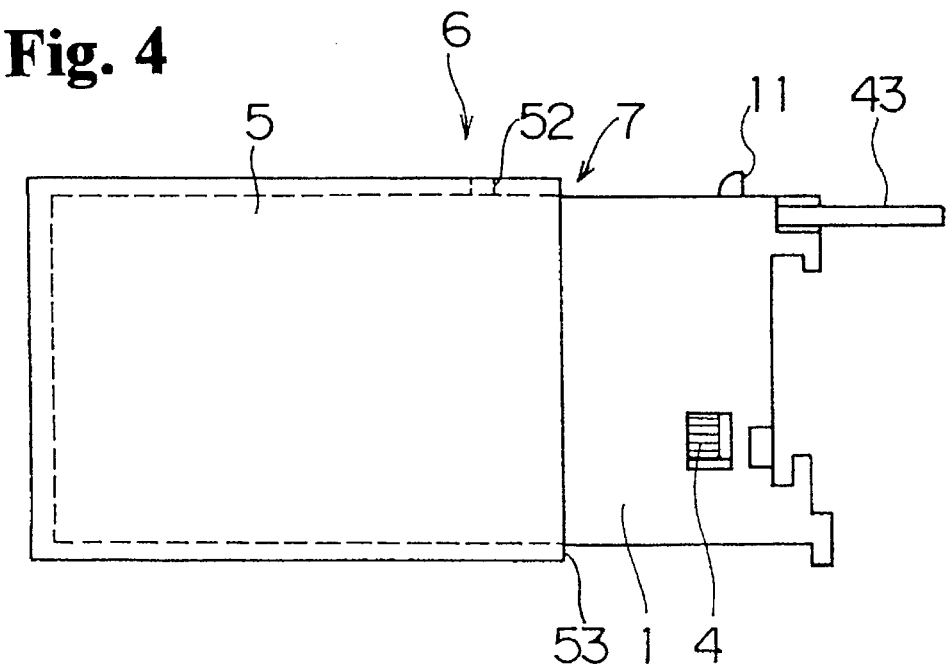
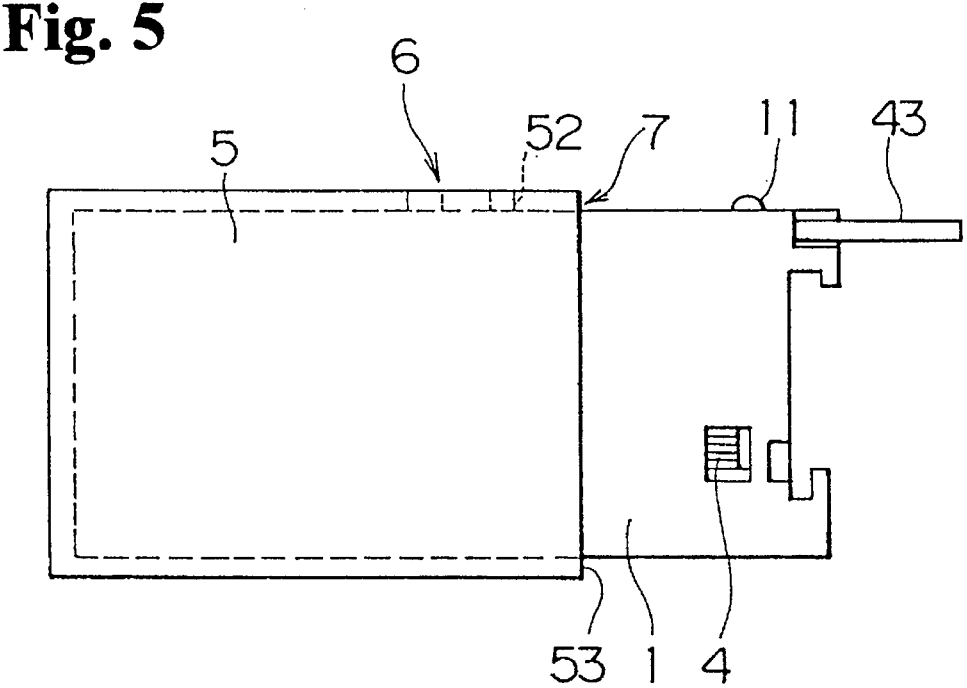

ELECTROMAGNETIC COUNTER

BACKGROUND OF THE INVENTION

The present invention relates to an electromagnetic counter in which the display of character wheels cannot be intentionally changed.

As shown in the exploded perspective view of FIG. 8, an electromagnetic counter is composed of a count display device that includes character wheels 2, a driving device for operating said count display device, a driving source of said driving device, frame 1 which incorporates the above, and casing 5 for containing said frame 1. Reference numeral 50 indicates a window opened in the front surface of casing 5, reference numeral 51 indicates a lens embedded in said window 50, and reference numeral 53 indicates an opening in the back surface of casing 5 which is opened for mounting frame 1 inside casing 5. In addition, reference numeral 10b indicates a back wall that covers the back surface of frame 1.

The above-mentioned count display device is equipped with a plurality of character wheels 2, pinion mechanism 22 which rotates these character wheels 2, and drive gear 2a attached to the lowest digit character wheel of character wheels 2. Reference numeral 21 indicates the rotation shaft of character wheels 2, while reference numeral 23 indicates the rotation shaft of pinion mechanism 22.

The above-mentioned driving device is equipped with a reciprocating rocker 3, which is supported to be able to reciprocate while rocking and on which is formed a pair of operating claws 3a and 3b that engage with the above-mentioned drive gear 2a at their front ends, armature 31 provided on said reciprocating rocker 3, and coil spring 32 of said reciprocating rocker 3.

The above-mentioned driving source is equipped with coil 4, and roughly U-shaped magnetic current plate 42 attached to bobbin 41 around which the windings of coil 4 are wrapped. This magnetic current plate is composed of internal piece 42a, which is inserted into a slit formed in the center of said bobbin 41, and external piece 42b, which is positioned on the outside of said bobbin 41. The above-mentioned armature 31 is able to be oscillated corresponding to magnetic current generated in coil 4. In particular, this driving source is composed so as to be able to be inserted into and removed from frame 1 by means of insertion port 18 opened in the rear side wall of the above-mentioned frame 1. Reference numeral 41f indicates flanges provided on both ends of bobbin 41.

The following provides an explanation of the operating state of this electromagnetic counter. When electric current flows to coil 4, magnetic force is generated in magnetic current plate 42. Front end 31b and rear end 31a of armature 31 are attracted in the directions of external piece 42b and internal piece 42a, respectively, of magnetic current plate 42, and reciprocating rocker 3 rocks centering on rotation shaft 3c. As a result, operating claw 3b moves and pushes drive gear 2a causing drive gear 2a to rotate by the amount of half a gear tooth. At this time, coil spring 32, attached between the rear portion of reciprocating rocker 3 and frame 1, compresses as a result of being pushed by reciprocating rocker 3.

Next, when the current flowing to coil 4 is cut off, the magnetic force of magnetic current plate 42 lapses, and reciprocating rocker 3 rotates in reverse centering on rotation shaft 3 due to the force of coil spring 32. As a result, operating claw 3a works to cause drive gear 2a to rotate by an amount of half a gear tooth. Namely, as a result of turning the electric current supplied to coil 4 on and off one time, drive gear 2a rotates by the amount equal to one gear tooth, and the number of the lowest digit character wheel 2 provided on said drive gear 2a advances by one. When this operation is repeated, the rotation of said character wheel 2 is sequentially transmitted to the adjacent character wheel 2 of the next highest digit by means of pinion mechanism 22.

Examples of applications of this type of electromagnetic counter include coin counters used in arcade games and vending machines. The output end of a sensor switch installed in the coin pathway extending from the coin slot to the coin stacker is wired to this electromagnetic counter. When the sensor switch detects the passage of a coin, a pulse is sent to coil 4 of said electromagnetic counter. As a result, the numbers of character wheels 2 advance according to the number of coins. Coins that have passed by the sensor switch are contained in a coin stacker. Namely, since the number displayed by character wheels 2 of this electromagnetic counter agrees with the number of coins in said coin stacker, the amount of sales can be determined by reading the number displayed by character wheels 2.

As has been described above, frame 1, which incorporates a counter mechanism in the form of character wheels 2 and so forth, is mounted in casing 5. Although casing 5 and frame 1 are in close contact with each other, they are not adhered together. For example, as a result of projection 11, provided on the wall surface of frame 1 engaging with hole 52 provided in the wall surface of casing 5, it is possible to prevent frame 1 from coming out of casing 5. By using projection 11 in the shape of a wedge tilted towards the front as shown in FIG. 8, frame 1 can be smoothly mounted in casing 5, while simultaneously having the characteristic of both members being difficult to separate in spite of this smooth mounting.

However, since a thin sharp object such as a cutter knife can be inserted between casing 5 and frame 1 from the side of opening 53 in the back surface of casing 5, a gap can be formed, although only extremely slight, between said members. If projection 11 is then dislodged from hole 52 by this operation, frame 1 can be removed from casing 5 without destroying casing 5. Since character wheels 2 are exposed when casing 5 is removed, the numbers being displayed can be freely tampered with by performing this operation intentionally.

After the value displayed by character wheels 2 has been altered to a smaller value, coins equal to the difference between the amount after tampering and the original amount are removed from the coin stacker, and the value of character wheels 2 after tampering is made to agree with the number of coins in the coin stacker. Finally, casing 5 is again inserted into frame 1. When this is done, it becomes possible to obtain an illegal profit without this illegal operation being noticed by anyone.

The object of the present invention is therefore to provide an electromagnetic counter in which casing 5 cannot be removed from frame 1 so that the display of character wheels 2 cannot be intentionally tampered with.

SUMMARY OF THE INVENTION

The above-mentioned object is achieved by mounting a synthetic resin frame, which incorporates a count display device that includes character wheels, a driving device for operating said count display device, and a driving source of said driving device, within a casing from the open side of said casing, and forming a welded portion by welding at least a portion of the contact portion between said frame and said synthetic resin casing using an ultrasonic welding device.

In addition, a projection able to engage in a hole provided in the wall of said casing is formed on the wall of said frame, said frame is installed on said casing, and together with engaging said projection in said hole, a welded portion is formed by welding said projection and said hole using an ultrasonic welding device.

In addition, a projection able to engage in a hole provided in the wall of said casing is formed on the wall of said frame, said frame is mounted on said casing, and together with engaging said projection in said hole, a welded portion is formed by welding at a location towards the front from said engaging portion using an ultrasonic welding device.

In addition, the end of the external piece of a magnetic current plate positioned outside a bobbin passes through the wall of said frame and is composed to be able to engage with a hole provided on the wall of said casing, said frame is mounted on said casing, and together with engaging said end with said hole, a welded portion is formed by welding at a location towards the front from said engaging portion using an ultrasonic welding device.

In addition, a flange, which covers at least a portion of the gap between a casing, able to be formed on the outer periphery of the back of said frame, and said frame, is formed on the frame side during mounting of said frame to said casing, and a welded portion is formed by welding at a location towards the front from said flange using an ultrasonic welding device.

A synthetic resin frame is mounted in a synthetic resin casing, and said casing and said frame are mutually in close contact. A welded portion is formed by an ultrasonic welding device on at least a portion of this contact portion, thus resulting in said casing and said frame being essentially adhered at this welded portion.

This means that even if a thin sharp object such as a cutter knife is inserted between said casing and said frame from the side of the opening in the back surface of said casing 5 as in the related art, said frame cannot be removed from said casing. Namely, the numbers displayed here following operation of the character wheels cannot be intentionally tampered with.

Furthermore, although the fastening of a portion of the contact portion between the casing and frame with rivets or nuts and bolts has also been examined, in the case of such a constitution, since the rivets and nuts and bolts tighten the frame, the frame is easily subjected to deformation. Since this can cause erroneous operation of the counter, this constitution was unable to be employed. In addition, although a constitution wherein a solvent is poured into the contact portion between the casing and frame to adhere the casing and frame was also considered, in the case of such a constitution, since the solvent ends up dissolving the synthetic resin components inside the frame resulting in deformation, this constitution was also not able to be employed. In contrast, these types of problems do not occur in the constitutions of the invention.

As a result, the present invention is able to provide an electromagnetic counter wherein the casing cannot be removed from the frame, and the display of the character wheels cannot be intentionally tampered with.

BRIEF DESCRIPTION OF THE DRAWINGS

FIG. 4 is a plan view of a third embodiment of the present invention.

FIG. 5 is a plan view of a fourth embodiment of the present invention.

DETAILED DESCRIPTION OF THE INVENTION

Now, embodiments of the invention will be described. It is to be construed that these embodiments are by no means limitative.

Figure 1:
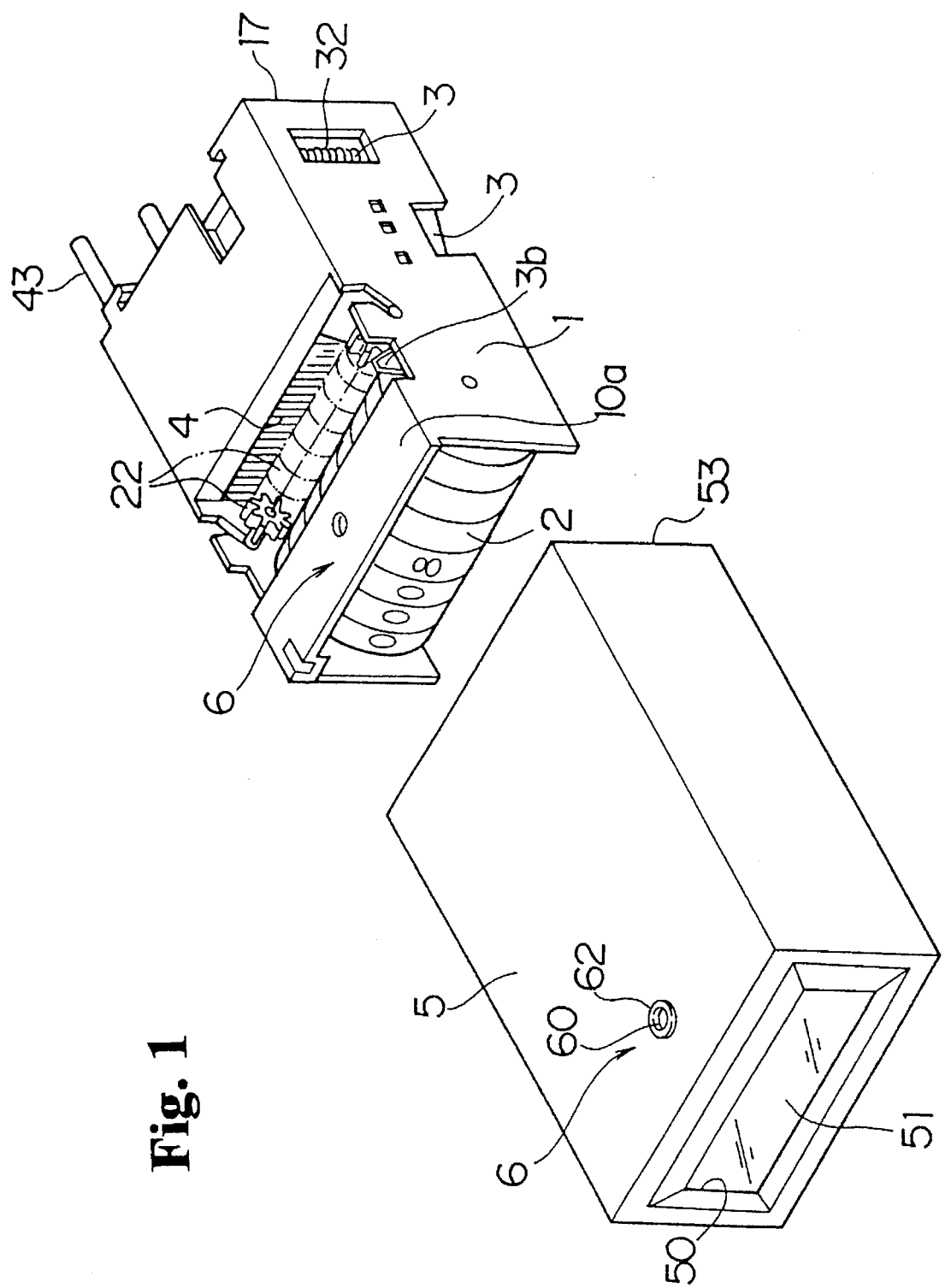
FIG. 1 is an exploded perspective view of a first embodiment of the present invention.
Figure 2:
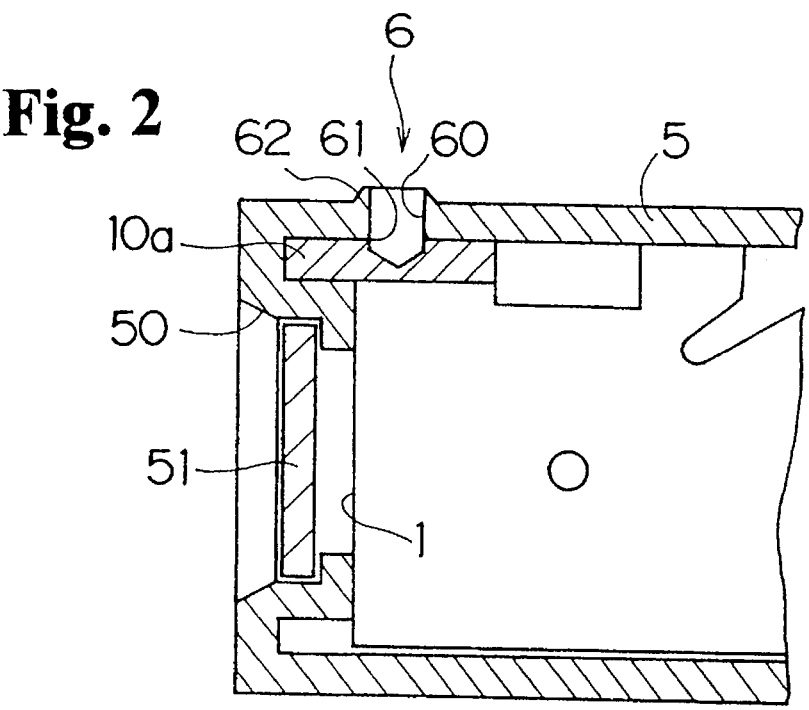
FIG. 2 is a partial cross-sectional view of said first embodiment of the present invention.

FIG. 1 is an exploded perspective view of a first embodiment of the present invention. A count display device that includes character wheels 2, a driving device for operating said count display device, and a driving source of said driving device are incorporated in frame 1, and said frame 1 is housed in casing 5. Nearly the entirety of the outer surface of frame 1 makes contact with the inner surface of casing 5. A welding processed portion 6 is formed by applying ultrasonic waves from the outside of casing 5 at a location corresponding to roughly the center of the front top plate 10a of frame 1. An ultrasonic welder is used to perform welding processing by attaching a horn (tool) to the tip of an ultrasonic oscillator and bringing this horn into contact with the site to be processed. In said first embodiment of the present invention, a horn having a conical tip is used, said horn is pushed perpendicularly against the prescribed site of casing 5, and casing 5 and frame 1 are welded as shown in FIG. 2. Reference numeral 60 indicates a through hole opened in casing 5 during processing, reference numeral 61 indicates a welded portion of casing 5 and frame 1, and reference numeral 62 indicates a material escape portion formed as a result of synthetic resin leaking out and pushed back when synthetic resin casing 5 melts and said horn enters into the through hole 60. In said first embodiment of the present invention, it is essential to perform welding so that, even though the above-mentioned horn passes through casing 5, it does not pass through frame 1, but rather stops in part way.

Frame 1 is mounted within casing 5, and a welded portion 61 is formed at a portion of the contact portion of both said members. Casing 5 and frame 1 are then essentially adhered together at this welded portion 61. As a result, frame 1 cannot be removed from casing 5, and the number displayed cannot be tampered with by operating the character wheels, thus eliminating such illegal acts as swindling by removing coins from a coin stacker.

In the above-mentioned first embodiment of the present invention, since a horn having a conical tip is used and said horn is operated so as to pass through casing 5, through hole 60 remains in the welding processed portion of casing 5 following processing. If this through hole 60 was tentatively thought to ruin the appearance, the horn can be operated so that it does not pass through casing 5 to prevent it from marking the surface of casing 5. In this case, in order to reliably perform welding processing by focusing the ultrasonic waves emitted from said horn onto welding processed portion 6, frame 1 should be formed into a shape like that described in the following second embodiment of the present invention.

Figure 3:
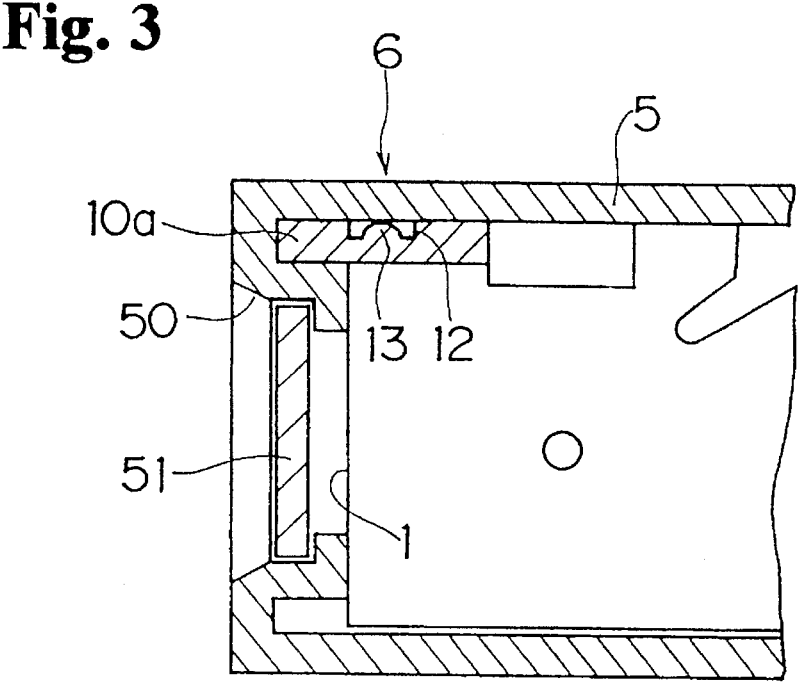
FIG. 3 is a partial cross-sectional view of a second embodiment of the present invention.

FIG. 3 is a partial cross-sectional view of a second embodiment of the present invention. A welding processed portion 6 is formed by applying ultrasonic waves from the outside of casing 5 at a location corresponding to roughly the center of the front top plate 10a of frame 1. Circular indentation 12 is formed roughly in the center of said front top plate 10a of frame 1 at this time, and projection 13 is formed in the center of said indentation 12. Furthermore, said projection 13 is formed so that the position of its apex either aligns with or protrudes somewhat from the surface of said front top plate 10a of frame 1. Since ultrasonic waves emitted from the horn tend to easily focus on projection 13, projection 13 and casing 5 in contact with projection 13 are efficiently melted and welded.

This type of projection can be provided on the surface in contact with frame 1 on the side of casing 5. Alternatively, it can also be provided at sites mutually relative to frame 1 and casing 5, thus enabling welding processed portion 6 to be formed in the same manner as described above.

Although welding processed portion 6 is formed on the front upper surface of casing 5 and frame 1 in the above-mentioned first and second embodiments of the present invention, in a third embodiment of the present invention, said welding processed portion 6 is formed on the side surface of casing 5 and frame 1.

In said third embodiment of the present invention, by engaging hole 52 provided on the side surface of casing 5 with projection 11 provided on the side surface of frame 1 as shown in FIG. 4, frame 1 cannot be removed from casing 5. However, the site of this projection 11 is characterized by being located at welding processed portion 6. Welding processed portion 6 can be formed by so-called knurling fastening or mounting fastening by combining the shape of the horn of the above-mentioned ultrasonic welder with projection 11 and hole 52 of the required shapes.

In the case of simply engaging hole 52 provided on the side surface of casing 5 with projection 11 provided on the side surface of frame 1, a thin sharp object such as a cutter knife can be inserted between casing 5 and frame 1 from the side of opening 53 in the back surface of casing 5. Since gap 7 is formed, although only slightly, between these two members, frame 1 can be removed from casing 5 by releasing projection 11 from hole 52. In contrast, according to the constitution of the above-mentioned third embodiment of the present invention, since casing 5 and frame 1 are strongly locked together as a result of welding projection 11 and hole 52, even if a sharp object such as a cutter knife is inserted into gap 7, frame 1 cannot be removed from casing 5.

Next, the following provides an explanation of a fourth embodiment of the present invention with reference to FIG. 5. In the above-mentioned third embodiment of the present invention, frame 1 cannot be removed from casing 5 since projection 11 is welded to hole 52. However, if a thin sharp object such as a cutter knife is inserted into gap 7 between casing 5 and frame 1 from the side of opening 53 in the back surface of casing 5, and projection 11 is repeatedly poked with said thin sharp object, there is the risk of projection 11 being broken off. In the case projection 11 is broken off in this manner, there is the risk of frame 1 being removed from casing 5.

Therefore, in said fourth embodiment of the present invention, hole 52 is provided on the side surface of casing 5, circular projection 11 is provided on the side surface of frame 1 able to engage with said hole 52, and projection 11 is engaged with the hole 52 to temporarily lock frame 1 and casing 5 as shown in FIG. 5. However, welding processed portion 6 is formed at a location towards the front from the engaged portion of said projection 11 and said hole 52.

Since projection 11 is located towards the rear from welding processed portion 6, it plays the role of protecting welding processed portion 6 from insertion of a sharp object such as a cutter knife into gap 7. In addition, since projection 11 is fixed in hole 52, a sharp object such as a cutter knife cannot be used to simply lift out projection 11 from hole 52. Projection 11 has the action of enabling the force applied when a sharp object such as a cutter knife is attempted to be pushed in to escape in the direction of the apex of projection 11. As a result, frame 1 cannot be removed from casing 5.

If the protection of welding processed portion 6 from the insertion of a sharp object such as a cutter knife into gap 7 by projection 11 is thought to be unstable, the constitution of a fifth embodiment of the present invention explained below should be employed.

Figure 6:
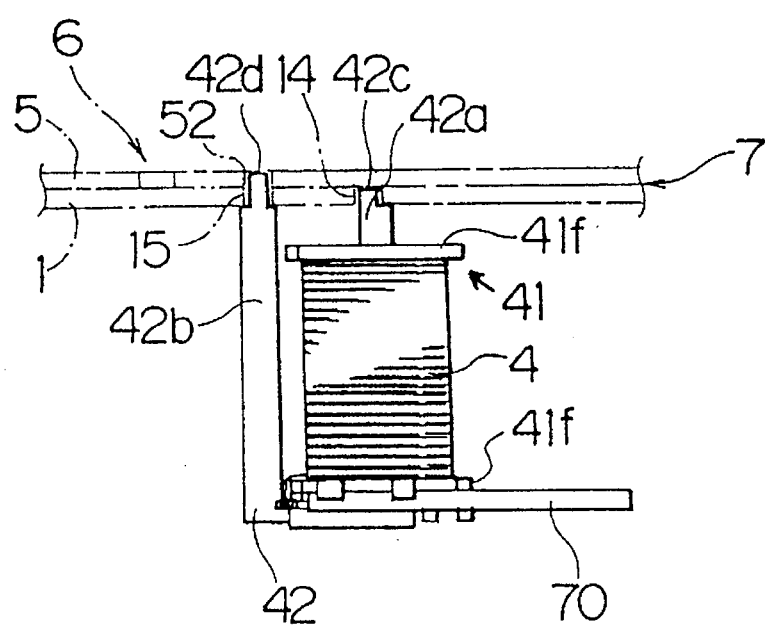
FIG. 6 is a plan view indicating the driving source of a fifth embodiment of the present invention.

FIG. 6 shows a driving source of a fifth embodiment of the present invention. This driving source is equipped with coil 4, and a roughly U-shaped magnetic current plate 42 attached to bobbin 41 around which the windings of said coil 4 are wrapped. This magnetic current plate 42 is composed of internal piece 42a, inserted into a slit formed in the center of said bobbin 41, and external piece 42b positioned outside said bobbin 41. Reference numeral 41f indicates flanges provided on both ends of said bobbin 41. Engaging projection 42c is provided on the end of internal piece 42a, while engaging projection 42d, which is longer than engaging projection 42c, is provided on the end of external piece 42b. Although engaging projection 42c engages with hole 14 opened in the side wall of frame 1, its size is such that it does not protrude to the outside from said side wall of frame 1. In contrast, although engaging projection 42d engages with hole 15 opened in the side wall of frame 1, its size is such that it engages with hole 52 opened in the side wall of casing 5 as a result of protruding to the outside from said side wall of frame 1. Welding processed portion 6 is formed at a location farther towards the front than the engaging portion of said projection 42d and hole 52.

Since projection 42d is located behind welding processed portion 6 and is a part of magnetic current plate 42 made of metal, even if a thin sharp object such as a cutter knife is inserted into gap 7 between casing 5 and frame 1 from the side of opening 53 in the back surface of casing 5, welding processed portion 6 can be completely protected.

In the above-mentioned first through fifth embodiments of the present invention, attention is focused on the insertion of a thin sharp object such as a cutter knife into gap 7 between casing 5 and frame 1 from the side of opening 53 in the back surface of casing 5. However, the significance of this problem ought to be reduced if gap 7 between casing 5 and frame 1 was tentatively able to be covered.

Figure 7:
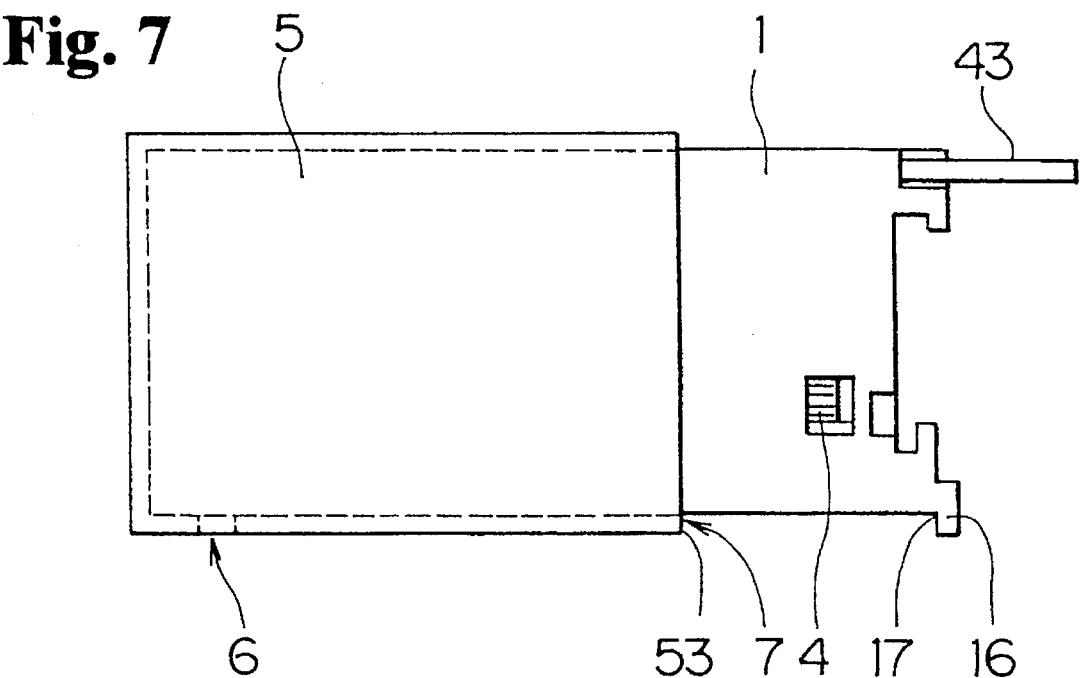
FIG. 7 is a plan view of a sixth embodiment of the present invention.

Therefore, in a sixth embodiment of the present invention, a flange 17 is formed on the outer periphery of the back surface of frame 1 which covers one of the side surfaces of gap 7 able to be formed between opening 53 in the back surface of casing 5 and outer periphery 17 of the back surface of frame 1 during mounting of frame 1 in casing 5 as shown in FIG. 7. Welding processed portion 6 is then formed at a location farther towards the front than said flange 17.

Since flange 17 covers gap 7 at this location, there is no room whatsoever to insert a thin sharp object such as a cutter knife into gap 7 from the outside, thus preventing said welding processed portion 6 from being destroyed. In addition, even if a sharp object such as a cutter knife was inserted into gap 7 at a location where flange 17 is not formed, since casing 5 and frame 1 are strongly locked together at welding processed portion 6, frame 1 cannot be removed from casing 5.

Figure 8:
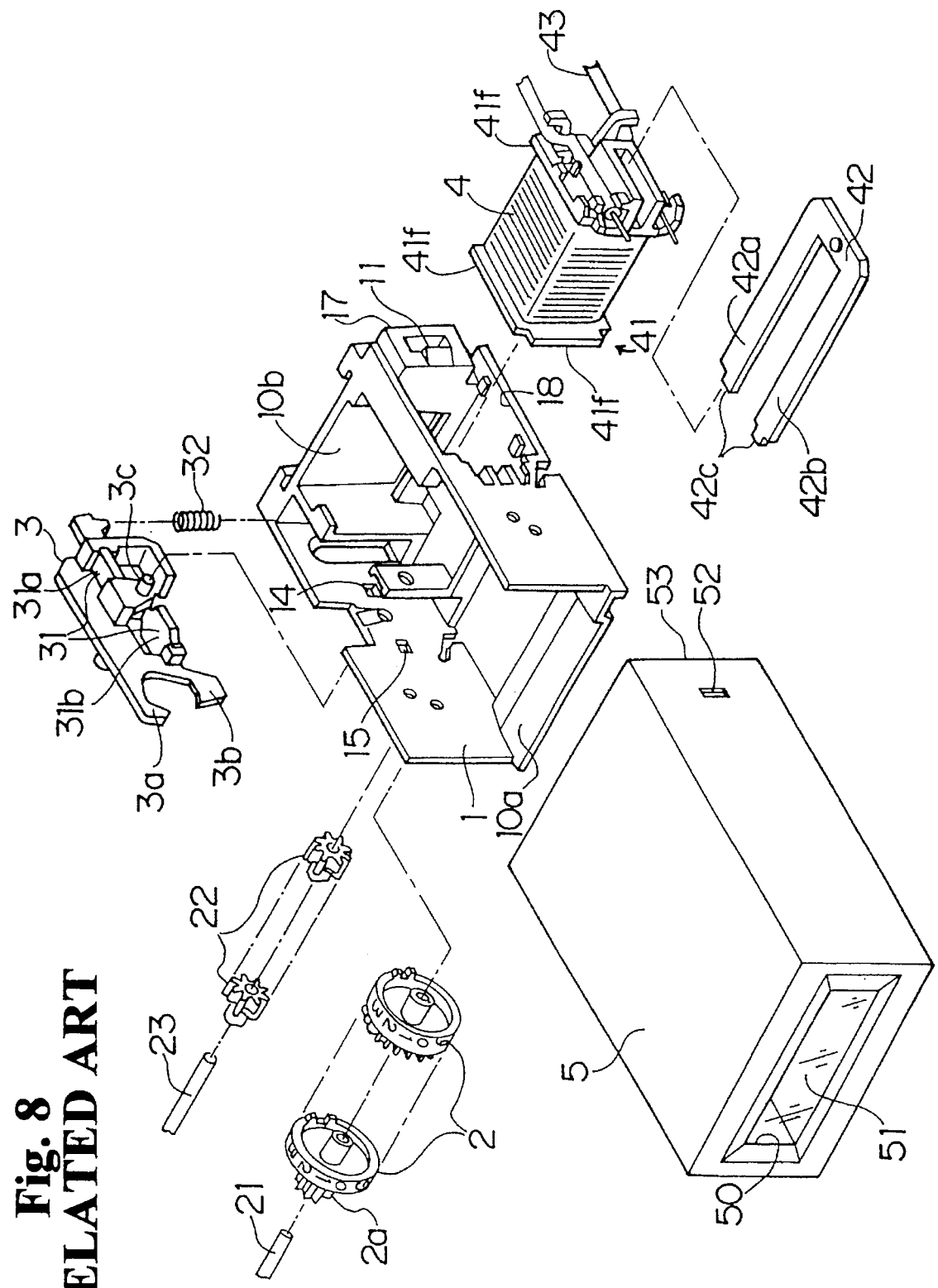
FIG. 8 is an exploded perspective view of an example of the related art.

Furthermore, the present invention is not limited to only the above-mentioned embodiments. For example, welding processed portion 6 may be provided at a plurality of locations of casing 5. It is preferable to form welding processed portion 6 at a portion that is difficult to reach with a sharp object such as a cutter knife when inserted into gap 7. Moreover, welding processed portion 6 can also be applied to electromagnetic counters of a design other than that of the electromagnetic counter shown in FIG. 8.

What is claimed is:

1. An electromagnetic counter comprising:
    a synthetic resin frame having a front portion,
    a counter display device disposed in the frame and having character wheels located at the front portion, and a driving device for operating the character wheels,
    a synthetic resin casing having a size to completely receive the frame therein, said casing having a window at one side so that the character wheels disposed in the frame are seen therethrough, and an opening at a side opposite to the window to allow the frame to enter into the casing, and
    means for focusing ultrasonic waves formed at the frame near the window so that when ultrasonic waves are applied to the focusing means through the casing, the frame and casing are welded thereat to prevent removal of the frame from the casing.

2. An electromagnetic counter according to claim 1, wherein said focusing means formed in the frame includes an indentation extending inwardly from an outer surface of the frame and a projection situated at a bottom of the indentation, said projection extending upwardly from the bottom and at least aligning the outer surface of the frame.

3. An electromagnetic counter comprising:
    a synthetic resin frame having a front portion,
    a counter display device disposed in the frame and having character wheels located at the front portion, and a driving device for operating the character wheels,
    a synthetic resin casing having a size to completely receive the frame therein, said casing having a window at one side so that the character wheels disposed in the frame are seen therethrough, and an opening at a side opposite to the window to allow the frame to enter into the casing, and
    means for connecting the frame and the casing, said connecting means including a hole formed in the casing, a projection formed on the frame to engage the hole when the frame enters into the casing, and a welding portion for connecting the casing and the frame formed at an area between the projection and the window by ultrasonic welding so that the welding portion is not accessible through a gap between the frame and the casing by the projection.

4. An electromagnetic counter according to claim 3, wherein said welding portion is located at a side wall of the casing.

5. An electromagnetic counter comprising:
    a synthetic resin frame having a front portion,
    a counter display device disposed in the frame and having character wheels located at the front portion, and a driving device for operating the character wheels, said driving device including a coil and a magnetic current plate having an internal piece located in the coil and an external piece located outside the coil,
    a synthetic resin casing having a size to completely receive the frame therein, said casing having a window at one side so that the character wheels disposed in the frame are seen therethrough, and an opening at a side opposite to the window to allow the frame to enter into the casing, and
    means for connecting the frame and the casing, said connecting means including an engaging projection integrally formed with the external piece and extending outwardly therefrom, holes formed in the frame and the casing, said engaging projection passing through the holes when the frame and the casing are assembled, and a welding portion for connecting the frame and the casing formed at an area between the engaging projection and the window by ultrasonic welding so that the welding portion is not accessible from a gap between the frame and the casing by the engaging projection.

6. An electromagnetic counter comprising:
    a synthetic resin frame having a front portion, a rear portion, and a flange formed at least at one side of the rear portion,
    a counter display device disposed in the frame and having character wheels located at the front portion, and a driving device for operating the character wheels,
    a synthetic resin casing having a size to receive the frame therein, said casing having a window at one side so that the character wheels disposed in the frame are seen therethrough, and an opening at a side opposite to the window to allow the frame to enter into the casing therethrough so that when the frame is disposed in the casing, the flange covers a gap between the frame and the casing, and
    a welding portion formed at an area between the flange and the window by ultrasonic welding so that the welding portion is not accessible from the gap by the flange.

* * * * *